United States Patent
Van Zon

[11] Patent Number: 5,953,071
[45] Date of Patent: Sep. 14, 1999

[54] RECOVERING HORIZONTAL SYNCHRONIZATION

[75] Inventor: Cornelis C.A.M. Van Zon, Eindhoven, Netherlands

[73] Assignee: U.S. Philips Corporation, New York, N.Y.

[21] Appl. No.: 08/869,263

[22] Filed: Jun. 4, 1997

[30] Foreign Application Priority Data

Jun. 6, 1996 [EP] European Pat. Off. .............. 96201562

[51] Int. Cl.[6] ........................................ H04N 5/05
[52] U.S. Cl. ........................ 348/544; 348/540; 331/17
[58] Field of Search ................................ 331/1 R, 10, 11, 331/17, 20; 348/536, 540, 542, 544, 545; H04N 5/05, 5/06, 5/04

[56] References Cited

U.S. PATENT DOCUMENTS

| | | | |
|---|---|---|---|
| 3,846,584 | 11/1974 | Itoh et al. | 178/69.5 |
| 3,909,735 | 9/1975 | Anderson et al. | 331/17 |
| 4,535,358 | 8/1985 | Duijkers | 348/542 |
| 4,928,075 | 5/1990 | Leis | 331/17 |
| 5,534,823 | 7/1996 | Kondou | 331/17 |

FOREIGN PATENT DOCUMENTS

| | | | |
|---|---|---|---|
| WO8202309 | 7/1982 | WIPO | H04N 5/05 |
| WO9214317 | 8/1992 | WIPO | H04L 7/00 |

OTHER PUBLICATIONS

"Die Horizontal–Vertikal–Kombination TDA 2579", Phillips Semiconductor Division in Valvo TI 841221, pp. 3–7.
"Synchronization Issues for Consumer TV", by Kees van Zon, Proceedings 1995, International Symposium on Synchronization, Dec. 14–15, 1995, pp. 165–170.

*Primary Examiner*—David E. Harvey
*Attorney, Agent, or Firm*—Edward W. Goodman

[57] ABSTRACT

A method of, a device for, and a storage medium for recovering horizontal synchronization from a TV-signal with the use of a PLL. The number of periods during which a predetermined degree of synchronization persists is counted and the result of the counting decreases the bandwidth of the PLL when the number of periods increases.

14 Claims, 4 Drawing Sheets

RECOVERING HORIZONTAL SYNCHRONIZATION

BACKGROUND OF THE INVENTION

1. Field of the Invention

This invention relates to a method and a device for recovering horizontal synchronization from a received TV signal by means of a phase-locked loop, comprising the steps of generating a recurring oscillatory signal, phase-comparing said oscillatory signal with horizontal synchronization pulses of said received TV signal, low-pass filtering the result of the phase comparison, and using the filtered result of the phase comparison to control the generation of the oscillatory signal, so as to reduce the phase error between the oscillatory signal and the horizontal synchronization pulses of the received TV signal.

2. Description of the Related Art

The publication "Valvo Technische Information, 841221", entitled "Die Horizontal- Vertikal Kombination TDA 2579," issued by Philips Semiconductor Division, describes a prior art horizontal synchronization recovering method. The purpose of the phase-locked loop is to synchronize an oscillatory output signal, which may, for instance, be used to control the scanning of a picture display with the synchronization pulses of a received TV signal. However, this signal is often severely distorted due to low S/N-ratio, echoes, reduced synchronization pulse amplitude, co-channel interference, etc. In the phase-comparing step, the phase angle of the synchronization pulses of the received TV signal is compared with the phase of the oscillatory signal. The phase-comparing step generates a signal which is proportional to the phase difference. In general, this signal consists of a steady state (DC) component which serves to control the generation of the oscillatory signal, and a fluctuating (AC) component which is caused by the unwanted distortions and which has to be suppressed as much as possible by the low-pass filtering.

In the process of suppressing the distortions, the bandwidth of the phase locked loop, which is inter alia determined by the bandwidth of the low-pass filter, is of crucial importance. The smaller this bandwidth is, the better the distortions are suppressed and the more stable the generated oscillatory signal will be. However the smaller the bandwidth is, the more difficult it is for the phase-locked loop to acquire the locked state. The locked state is preceded by a "catching" state which is the state wherein the frequency and/or the phase of the oscillatory signal is so far away from those of the input signal that it is impossible for the phase-locked loop to become locked. During the catching state, the synchronization pulses of the input signal are usually arranged to directly synchronize the oscillatory signal, of course with the oscillatory signal having all the fluctuations caused by the distortions of the input signal and by the inaccuracy of the measurement. One method of direct synchronization is to apply the input signal, or at least the synchronization pulses of the input signal, directly to the oscillator thereby bypassing the phase detector and the loop filter. Another method which is e.g., known from U.S. Pat. No. 3,846,584 is to switch the loop filter off, so that its bandwidth is very large and the synchronization pulses of the input signal reach the oscillator unfiltered. When the input synchronization pulses and the oscillatory signal sufficiently coincide, the phase-locked loop is switched into "locked" operation.

Practical phase-locked loops for the horizontal synchronization of TV-signals have a loop filter bandwidth of several hundreds of Hertz., e.g., 200 Hertz. This is a compromise between reasonably stable operation of the oscillator in the locked mode, on the one hand, and a reasonably easy and quick transition from the catching state into the locked state, on the other hand. If the bandwidth is much smaller, the locked state can only be entered when the frequency and phase of the oscillatory signal are very close to the frequency and phase of the incoming synchronization pulses. This is very hard to achieve in the catching state.

SUMMARY OF THE INVENTION

It is an object of the present invention is to obtain both an easy and quick catch as well as a stable and substantially distortion free locked operation. To this end, the method according to the present invention is characterized by the step of counting the number of periods during which a predetermined degree of synchronization between said oscillatory signal and the horizontal synchronization pulses of the received TV signal persists, and the step of controlling a bandwidth of said phase-locked loop in response to the result of said counting, so as to progressively reduce said bandwidth when said number of periods increases. Therefore, when the catching state is left and the locked state is entered, the bandwidth of the phase-locked loop is rather broad (e.g., 170 Hz) so as to make the transition from the catching state into the locked state easy and quick. After this transition, rather large deviations in frequency and/or phase between oscillatory signal and input signal may still exist. When the locked state continues, the bandwidth of the phase-locked loop becomes gradually smaller, just like the width of a funnel, until an end-value (of, e.g., 4 Hz) which is much smaller than the usual bandwidth of prior art phase-locked loops.

A traditional phase-locked loop uses the average phase difference at the loop filter output to adjust the frequency at the local-oscillator output. This results in a system which can be dimensioned such that the average phase difference converges substantially to zero and the line frequency to the correct value. Such a system, being the best solution in analog hardware, contains a fundamental performance limitation which is caused by the fact that there is a single process recovering both phase and line length, whereas the line length is, in fact, independent of the phase. Imagine for instance that the line length is correct, but the phase is not. In order to adjust the phase, the traditional phase locked loop changes the line length which therefore will no longer be correct. As already suggested in the publication "Synchronization Issues for Consumer TV", pages 165–170 of "Proceedings 1995, International Symposium on Synchronization", Saalbau, Essen, Germany, Dec. 14–15, 1995, this drawback can be avoided by applying a dual-loop PLL. In accordance with an advantageous embodiment of the invention, the method may therefore be further characterized by the steps of using the result of the phase comparison to generate a signal indicative of the length of the period of said oscillatory signal, low-pass filtering the length indicative signal so obtained, and using the filtered length indicative signal to control the generation of said oscillatory signal, whereby the bandwidth of the low-pass filtering is controlled by the result of said counting.

In designing the low-pass filtering it has to be realized that the DC-component of the signal transferred through the low-pass filtering determines the length of the period (=the frequency) of the oscillatory signal. Therefore, the method according to the invention is further characterized in that the zero frequency transfer of the low-pass filtering of the length indicative signal remains unaffected by the control of the bandwidth. More particularly, the method according to the invention may be characterized in that the low-pass filtering of the length indicative signal is a digital filtering having a z-transform function $$C*(1-\alpha)^n/(1-\alpha/z)^n$$

wherein C is a constant, n is a positive integer, and α is controlled by the result of the counting.

In a method according to an embodiment of the invention wherein, as described above, a filtered line length indicative signal is generated and used to determine the length of the periods of the oscillatory signal, the result of the phase comparison should, in addition, control the phase of the oscillatory signal. In order to further reduce the influence of noise and other disturbances on the generation of the oscillatory signal, the method, according to the invention, may be further characterized in that the result of the counting controls this phase control. As will be explained in connection with FIG. 2, a simple method for controlling the phase control consists in that the result of the counting progressively attenuates the phase control of the oscillatory signal when said number of periods increases.

Preferably the method according to the invention is further characterized in that the bandwidth of said phase-locked loop is kept constant at a certain level during a first number of said periods, is progressively reduced towards a lower level during a second number of periods, and is again kept constant at the lower level when the number of periods exceeds said second number. This makes it easy to dimension the filtering process, where the bandwidth during said first number of periods determines the initial convergence speed of the synchronization process, and the bandwidth after said second number of periods determines the final accuracy thereof.

Where, according to the invention, the bandwidth of the phase-locked loop is reduced in response to the result of the counting when the number of periods during which a predetermined degree of synchronization exists, increases, so may the bandwidth of the phase-locked loop preferably be increased when said predetermined degree of synchronization no longer exists. Such an increase in bandwidth can be made maximal, e.g., by resetting the result of the counting to zero, or in steps by reducing the result of the counting, e.g., by 1 or by dividing the result of the counting by a predetermined factor each time the degree of synchronization does not exist.

The step of phase comparing includes the necessity of determining the position of the synchronization pulses in the received TV signal. This may preferably be done by comparing the level of the received signal with a slice level and determining the intersections of the edges of the synchronization pulse with the slice level. The slice level itself may be determined by measuring the black level and the top sync level of the received signal and calculating the slice level, e.g., halfway there between. Ideally, the slice level is a constant value, but this may be disturbed by noise, etc., in the received signal. In order to remove, as much as possible, the noise and other disturbances from the slice level, the invention may be characterized by detecting, from the received TV signal, a slice level, low-pass filtering the slice level, using the filtered slice level, and in the phase comparison between said oscillatory signal and the horizontal synchronization pulses of the received TV signal, the result of the counting additionally controlling the bandwidth of the slice level filtering so as to progressively reduce this bandwidth when said number of periods increases.

The invention also relates to a device for recovering horizontal synchronization from a received TV signal. It may be noted that the steps of counting the number of periods during which said predetermined degree of synchronization exists, and the step of controlling the bandwidth of a phase-locked loop in response to the result of said counting, may be implemented far more easily in software than in hardware. Therefore, a device for recovering horizontal synchronization from a received TV signal is preferably characterized by comprising a digital signal processor and a memory comprising a stored program to control the operation of the device.

The invention also relates to a display apparatus comprising the device for recovering horizontal synchronization from a received TV signal.

It is also possible to upgrade devices which are already on the market, for instance, by replacing a program, loaded in a memory of such device, by an upgrade version which uses one or more aspects of the present invention. Such upgrade version may be available in the form of a diskette, a CD-ROM, a smart card, or any other suitable storage medium. Therefore, the invention also relates to a storage medium comprising a stored program to control the operation of a signal processor for recovering horizontal synchronization from a received TV signal.

The invention also relates to a signal comprising a program to control the operation of a signal processor for recovering horizontal synchronisation from a received TV signal.

BRIEF DESCRIPTION OF THE DRAWINGS

These and other aspects of the invention will be described with reference to the attached figures. In the drawings.

DESCRIPTION OF THE PREFERRED EMBODIMENTS

Tables 1 and 2 can be found at the end of this Description. Table 1 lists a C-code program function used in the functional diagram of FIG. 2, and Table 2 lists a second C-code program function used in the functional diagram of FIG. 2.

Figure 1:
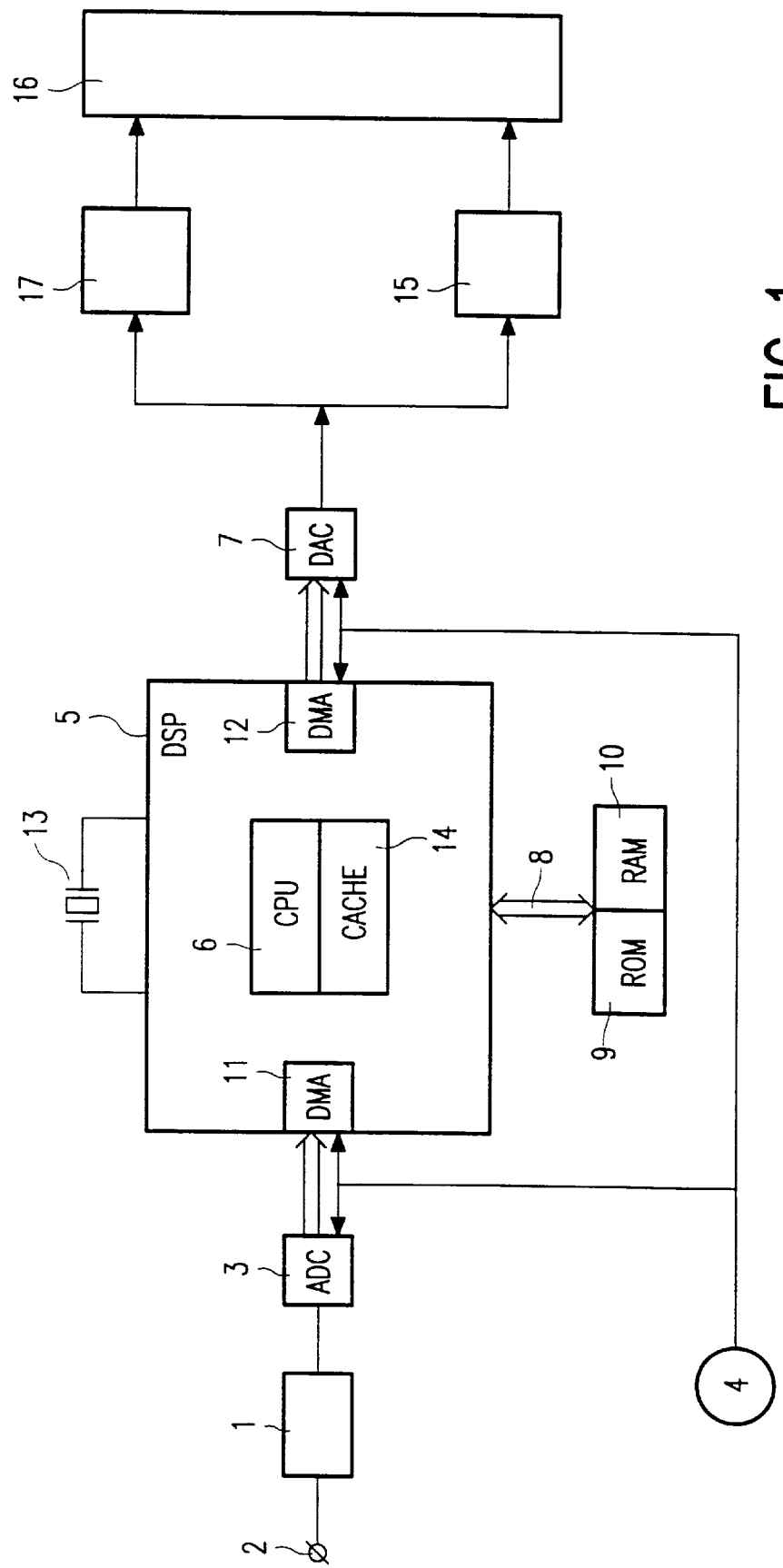
FIG. 1 shows part of a display apparatus comprising a device wherein a software implementation of the invention may be used.

FIG. 1 shows a TV front end 1 with an input terminal 2 for connection to an aerial. The front end comprises the usual RF and IF stages for selecting, amplifying and detecting Video Blanking. This signal is applied to an ADC-converter 3 where the signal is sampled and digitized under the control of a clock generator 4. For a standard interlaced PAL-B signal with 15625 Hz line frequency and 50 Hz raster frequency, the sample rate may e.g., be 13.5 MHz, which implies that a standard TV-line contains 864 samples.

The device of FIG. 1 further comprises a Digital Signal Processor (DSP) 5, with a Central Processing Unit (CPU) 6 for processing the digital CVBS signal, and one or more DAC-converters 7 for converting and outputting the components of the processed signal, such as for instance, Y, U, V video signals and the horizontal and vertical scanning information. The Y, U, V video signals are processed in a video processing unit 17 to supply video drive signals to a display device 16. Both the horizontal and vertical scanning information are processed in an addressing unit 15 for determining the position of the video signals on a screen of the display device 16. The display device 16 may, for example, be a cathode ray tube, a liquid crystal display, or a plasma display. The DSP 5 is connected, through a communication bus 8, to a program memory 9 of ROM-type and to a data memory 10 of RAM-type. The RAM-memory 10 serves inter alia for storing samples of input signals and samples of output signals. The storage of input signals from the ADC 3 into the RAM 10 and the reading of output signals from the RAM 10 to the DAC's 7 takes place via Direct Memory Access (DMA) units 11 and 12, respectively, which are part of the DSP 5. The operation of the DMA units 11 and 12 may be independent of the operation of CPU 6 so that the CPU is free for its processing tasks. The ADC 3, the DAC's 7 and the DMA units 11 and 12 are all controlled by the clock generator 4. In contradistinction, the CPU 5 is controlled by a clock which is determined by a crystal 13 and whose frequency is substantially higher (e.g., more than 100 Mhz) than the frequency of clock generator 4.

More in detail is the operation of the device of FIG. 1 as follows. The CVBS input samples are stored via DMA unit 11 in a part of RAM 10 which serves as a cyclic "input buffer". The size of the input buffer is quite arbitrary but should be large enough to store at least several TV-lines. A writing pointer keeps up with the progress of the writing process. When the input buffer is full, the writing of input samples will return to the beginning of the input buffer.

Figure 2A:
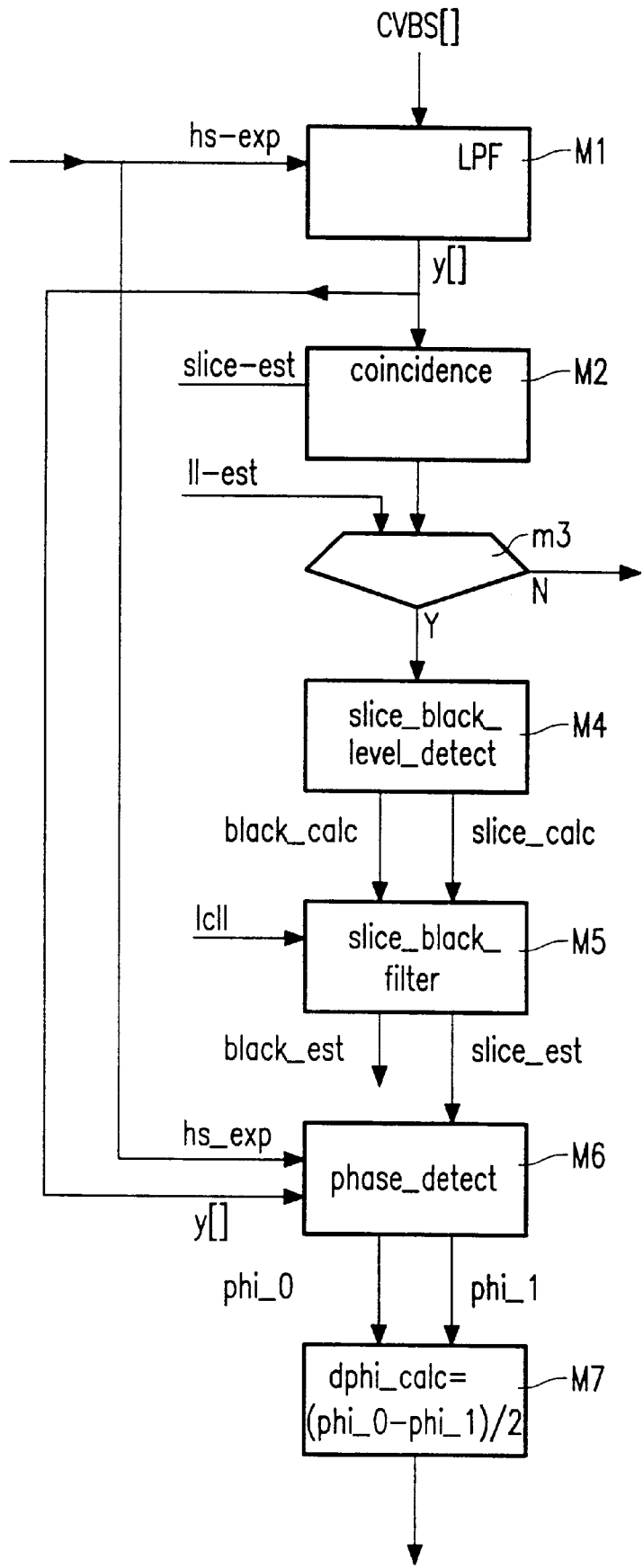
FIG. 2 shows a functional diagram of a program wherein the invention is implemented.
Figure 2B:
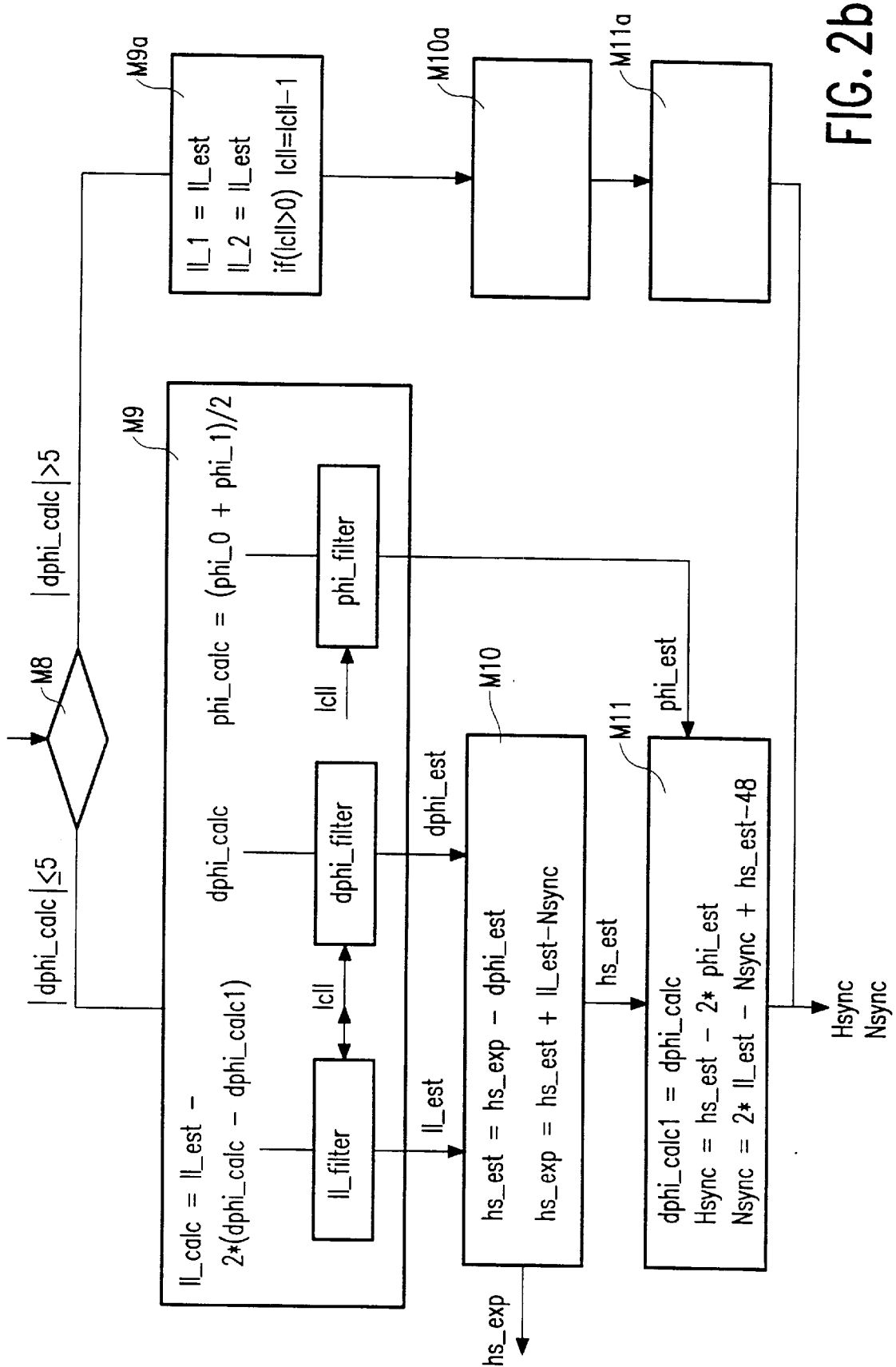

Meanwhile, the CPU reads successive portions, each with the size of a single TV-line, from the input buffer and stores such portion in a part of the RAM 10, which is hereafter called the "CVBS[ ]-array", see FIG. 2 and accompanying description. The CPU processes such single TV-line portions under the control of program instructions which are stored in ROM 9. These program instructions may comprise programs for demodulating sound IF, for synchronization recovery, for subcarrier regeneration, for color decoding, for teletext decoding, etc. More particulars hereof may be found in Applicant's prior U.S. patent application Ser. No. 08/489,876 filed Jun. 13, 1995 (PHN 14,905) which is herein incorporated by reference. As will be shown with reference to FIG. 2, the synchronization recovery program generates inter alia a variable "Nsync" which contains the number of samples which the CPU has to copy from the input buffer into the CVBS[ ]-array. A reading pointer keeps up with the progress of the reading process. Because the writing process into the input buffer is continuous and can not be halted, the reading and processing of the successive single TV-line portions should be faster than the writing process and, by comparing the reading pointer with the writing pointer, the program determines when the reading process has to be halted until sufficient new samples are written into the input buffer. In this way, a synchronization between the operation of clock generator 4 and of the CPU is obtained.

The output samples generated by the CPU are stored in a further part of RAM 10 which is called "output buffer", and the samples so collected in the output buffer are read and transferred by DMA 12 to the DAC's 7 in a way similar to the way described above for the input buffer. While communication bus 8 is used both by the two DMA units and by the CPU, this communication bus may easily be overloaded. To minimize the use of the communication bus and to give the CPU fast memory access, a cache memory 14 is provided for the communication of data and instructions to and from the CPU.

The functional diagram of FIG. 2 shows a part of the program contained in the read only memory 9, namely, that part of the program that handles the horizontal synchronization recovery in the locked state. The catching state is handled in another part of the program (not shown) which gives a first estimation of the location of the horizontal synchronization pulse and of the expected line length. This can be done e.g., by applying a minimum segment sum method. This method implies that the sum of the samples in a segment of for instance 60 samples is calculated. Then the segment is shifted by one sample and the sum is again calculated, etc. When the sum is minimal, a synchronization pulse is assumed.

For better understanding the functional diagram of FIG. 2, predetermined preferred values for processing a standard interlaced 50 Hz, 625 lines PAL-TV signal are given. However, these values should be considered merely as examples. In the actual source-code used by the applicant, these values are represented by named constants or variables so that they may be easily changed e.g., in the case that a different TV-standard has to be processed.

A first program-module M1, which is called "lpf", receives the signal-samples which are contained in the linear array CVBS[ ]. This array may comprise e.g., 2500 array-elements for storing part of the received CVBS-signal. At a sample-frequency of 13.5 Mc/s, one TV-line of a standard PAL-TV-signal contains 864 samples, however preferably, the array CVBS[ ] contains more space for example, to store more than one such line and/or to be able to handle other TV-standards such as HDTV.

The program-module M1 performs the following functions:

Firstly, the module low-pass-filters the received samples. The sync-signals to be processed are low-frequency signals compared to video. To reduce the influence of high frequency signal components and distortions (e.g., chroma and noise, respectively) on the sync recovery, the bandwidth of the CVBS-signal is reduced to less than 1 MHz. The low-pass filtered output samples are stored in an output array y[ ]. Each such output-sample is obtained by adding to a specific CVBS-(center)-sample e.g., the five juxtaposed left samples and the five juxtaposed right samples, each with a weighing-factor which is smaller the more such sample is remote from the center-sample. The filter so obtained is a digital software-implemented transversal low-pass filter.

Simultaneously, in the program-module M1 the signal is subsampled. Because the output signal in the y[ ]-array has reduced bandwidth compared to the input signal in the CVBS[ ]-array, it is possible to reduce the number of output samples by subsampling. In the tested program, the subsampling has been done by a factor 2, although a larger factor is also possible. After the generation of an y-sample from a set of (eleven) juxtaposed CVBS-samples, the next y-sample is calculated from a new set of (eleven) juxtaposed CVBS-samples which is shifted with respect to the first set not by one but by two CVBS-samples. In other words: only each even (or each odd) CVBS-sample is used as a center-sample to generate the output samples.

As shown in FIG. 2 the program-module M1 receives a variable "hs_exp". This is a floating point variable which points to the position of the CVBS[ ]-array where the program expects to find the center of the horizontal sync-pulse. The value of "hs_exp" has been calculated during the preceding execution of program module M10 still to be described (or by the part of the program which handles the catching-mode). The program-module M1 uses the integer part of the variable "hs_exp" to place the center of the sync-pulse at or near a fixed position in the y[ ]-array, for instance, at position 24, so that array-element y[24] contains (approximately) the mid-sync-sample of the output signal.

With one PAL-TV-line in the CVBS[ ]-array comprising (nominally) 864 samples, and with a subsampling by a factor 2, the output-array y[ ] would require at least 432 elements to store the complete output-line. However because, for the further sync-recovery calculations, only the samples near the horizontal sync-pulse are of interest and because the position of the horizontal sync-pulse in the output array is already approximately known (around element 24) the length of the output array can be reduced to considerably less than one TV-line with corresponding saving in memory and processing time. In the tested program, the y[ ]-array contained only the elements 0–75 with the expected horizontal sync-pulse approximately in the positions 12–36.

Figure 3A:
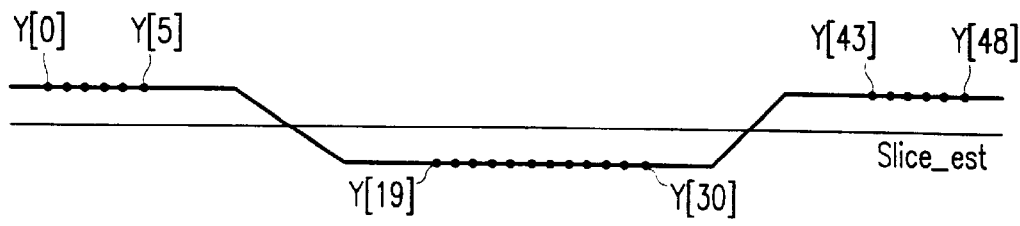
FIGS. 3a and 3b show signal waveforms for explaining the diagram of FIG. 2.

A second program-module M2, called "coincidence", receives the y-samples derived in module M1 and a variable "slice_est" representing the estimated slice level. This slice level lies (preferably halfway) between black level and top-sync level and is calculated during the preceding execution cycle of the program in a manner described below in connection with the program-modules M4 and M5. The purpose of the coincidence module is to ascertain whether indeed, a horizontal sync-pulse is present at the expected position (between the samples 12 and 36) in the y[ ]-array. The module compares the value of the y-samples 0–5, 19–30, and 43–48 with the estimated slice level given by the variable "slice_est". This is illustrated in FIG. 3a. In the coincidence module M2, a counter "coincidence", which is beforehand initialized to zero, is increased by 1 each time one of the 12 samples 0–5 and 43–48 is above slice level, and also each time one of the samples 19–30 is below slice level. Consequently, the maximum value the counter can obtain is 24 which means that a perfect sync-pulse is located at the correct position. In a decision making module M3, the counter "coincidence" is compared with a predetermined constant of value 19 and decides to continue with the described program if the counter exceeds this value i.e., if the coincidence is better than 19.

Simultaneously, the decision making module M3 checks whether a variable "ll_est", calculated during earlier execution of the program and which represents the estimated line length (in CVBS-samples) between two consecutive horizontal sync-pulses, is below a maximum acceptable line length value of 940. If the coincidence condition or the line-length condition is not met, the program will check inter alia whether a vertical sync-pulse is present, and will then enter the part of the program handling vertical synchronization recovery or will else return to the catching mode.

When both conditions are met, the program enters into a program module M4 "slice_black_level_detect". This module calculates the top-sync level, which is the mean value of the y-samples 16–31 (which all lie within the sync-pulse), and the black level, which is the mean value of the y-samples 59–75 (which all lie on the back porch of the sync-pulse). The black level is stored in a variable "black_calc". The halfway value between black level and top-sync level is calculated and stored as a slice level in a variable named "slice_calc". Because the slice level and the black level so obtained may fluctuate due to noise or other disturbances, both values are low-pass filtered in a program module M5 named "slice_black_filter", and the filtered values are stored in variables "slice_est", and "black_est", respectively. Further details about the program-module M5 will be given afterwards.

At this instance, the program enters into a software implementation of a phase-locked loop comprising a phase detector module M6, a loop filter module M9 and an oscillator module M10.

Figure 3B:
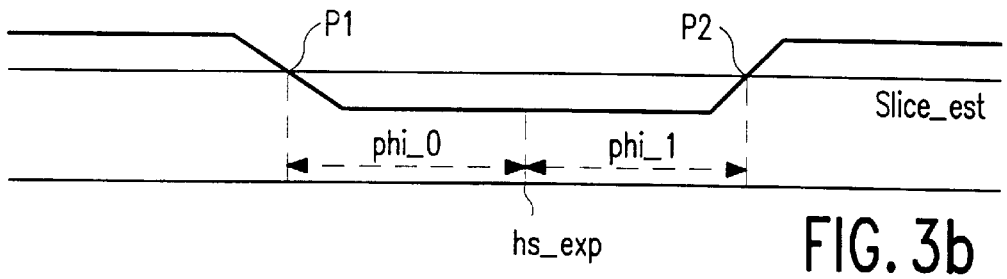

The phase detector module M6 performs the following actions, which are elucidated with the aid of FIG. 3b:

The module determines the position of the intersection P1 of the leading edge of the sync-pulse, represented by the y-samples, with the slice level, given by the variable "slice_est". This position is determined with floating point accuracy by interpolating the value of the sample just before and of the sample just behind the intersection.

The module determines, in equal manner, the position of the intersection P2 of the slice level with the trailing edge of the sync-pulse.

The module transforms, with floating point accuracy, the CVBS-position indicated by the floating point variable "hs_exp" to the corresponding y[ ]-array position.

Finally, the module calculates the distance between the leading edge intersection point P1 and the position indicated by "hs_exp" and stores this distance in a floating point variable "phi_0",and, similarly, it calculates the distance between the position indicated by "hs_est" and the trailing edge intersection point P2 and stores this distance in a floating point variable "phi_1". "phi_0" and "phi_1" are expressed in y-samples.

Subsequently, the program calculates, in a statement M7, the "phase difference" dphi_calc=(phi_0-phi_1)/2 which is the difference between the measured, center position of the sync-pulse halfway between the intersection points P1 and P2 and the expected position given by the variable "hs_exp", which is calculated by the oscillator compares this phase difference with a predetermined threshold (of, e.g., 5 y-samples) and when the phase difference is below this threshold, the program will continue with the loop filter module M9.

As already explained in the introductory part of this application, a much better performance of the phase-locked loop is obtained when phase and line length are. each processed and filtered separately. Therefore program module M9 starts with calculating the line length, and separately filters the phase difference and the line length. The line length of the current line is calculated by the statement:

ll_calc=ll_est−2*(dphi_calc-dphi_calc1)

Herein, ll_est represents the calculated and filtered line length of the previous line, dphi_calc is the calculated phase difference between the expected (hs_exp) and the measured center of the sync pulse currently under investigation, and dphi_calc1 is the phase difference calculated during the preceding execution of the program. The factor 2 stems from the fact that dphi_calc and dphi_calc1 are expressed in numbers of y-samples and ll_calc and ll_est in numbers of CVBS-samples. From the above mentioned statement, it is apparent that when the phase difference of the current line and of the previous line are both zero, the previously calculated line length is preserved (ll_calc=ll_est). However, also when the phase differences are not zero but equal, the previously found line length is apparently correct and thus unchanged and only the phase (i.e., the sync pulse position indicated by "hs_exp") needs correction.

When the system is in lock, it has to track changes in phase and in line length. Especially standard broadcast TV-signals have a well defined time-base but may have a very low signal/noise ratio. The real line length therefore hardly changes but nevertheless the measured phase difference and line length may contain large errors. Therefore, these measured values have to be filtered so that a measured change in phase and/or line length will result in a much smaller change in the respective filter-output values. To this end, the loop filter module M9 of FIG. 2 contains a function "ll_filter" for filtering the calculated line length "ll-calc" and outputting the filtered line length "ll_est. Moreover, it contains a function "dphi_filter" for filtering the calculated phase difference "dphi_calc" and outputting the filtered phase difference "dphi_est".

Preferably, for the line length filter "ll_filter", a software version of a recursive digital filter with the following z-transform is used:

$$H(z) = C * \left(\frac{1-\alpha}{1-\alpha z^{-1}}\right)^n \qquad \text{I}$$

wherein C is a constant and n is a positive integer. In practice, the best compromise between simplicity and effectiveness is a second order filter (n=2) with C=1, giving for the z-transform H(z):

$$H(z) = \left(\frac{1-\alpha}{1-\alpha z^{-1}}\right)^2 \qquad \text{II}$$

The −3 db bandwidth of this filter is:

$$f_c = \arccos\left(\frac{1+\alpha^2-(1-\alpha)^2\sqrt{2}}{2\alpha}\right) \cdot \frac{f_H}{2\pi} \qquad \text{III}$$

where $f_H$ is the line frequency of, for example, 15625 Hz in the PAL B-standard.

A usual value of the −3 db bandwidth of a PLL-filter for H-sync recovery is about 200 Hz. When a larger bandwidth would be used, low frequency errors would pass easily through the filter resulting in a fluctuating horizontal scan and in a correspondingly unquiet picture. On the other hand, when the bandwidth is made much smaller, it would take too much time for the system to acquire the correct synchronization. Therefore, the choice of the loop filter bandwidth is clearly a matter of compromise. To avoid this compromise, the bandwidth of the line length filter is made dependent an a "convergence"-counter "lcll". This counter increments each time a predetermined degree of synchronization exists. With increasing convergence counter, the bandwidth decreases, so that the sync recovery is more robust and less susceptible to noise and other distortions the longer the synchronization is correct and the more the synchronization is reliable. An easy way to implement this is to make the parameter α in the above formulas as follows dependent on the convergence-counter "lcll":

$$\text{If } lcll < TR_0 \quad \alpha = \alpha_0 \qquad \text{IV}$$

$$\text{If } TR_0 \leq lcll < TR_1 \quad \alpha = 1 - \frac{1}{CONV(lcll - TR_0) + \frac{1}{1-\alpha_0}} \qquad \text{V}$$

$$\text{If } TR_1 \leq lcll \quad \alpha = 1 - \frac{1}{CONV(TR_1 - TR_0) + \frac{1}{1-\alpha_0}} = \alpha_1 \qquad \text{VI}$$

In this example, α is constant and equal to $\alpha_0$ (=0.90) as long as lcll is below TR0 (=25 lines), α slowly increases from $\alpha_0$ to $\alpha_1$ when lcll increases from TR0 (=25 lines) to TR1 (=10000 lines), and α stays at $\alpha_1$ when lcll≧TR1. With $\alpha_0$, TR0 and TR1 chosen as indicated above, the value of $\alpha_1$ can be determined with the choice of the constant "CONV". In the practical embodiment, this constant was set to 0.04 resulting in $\alpha_1$=0.997555. Note that $\alpha_0$ determines the initial convergence speed, and $\alpha_1$ determines the final accuracy of the synchronization process.

Figure 4:
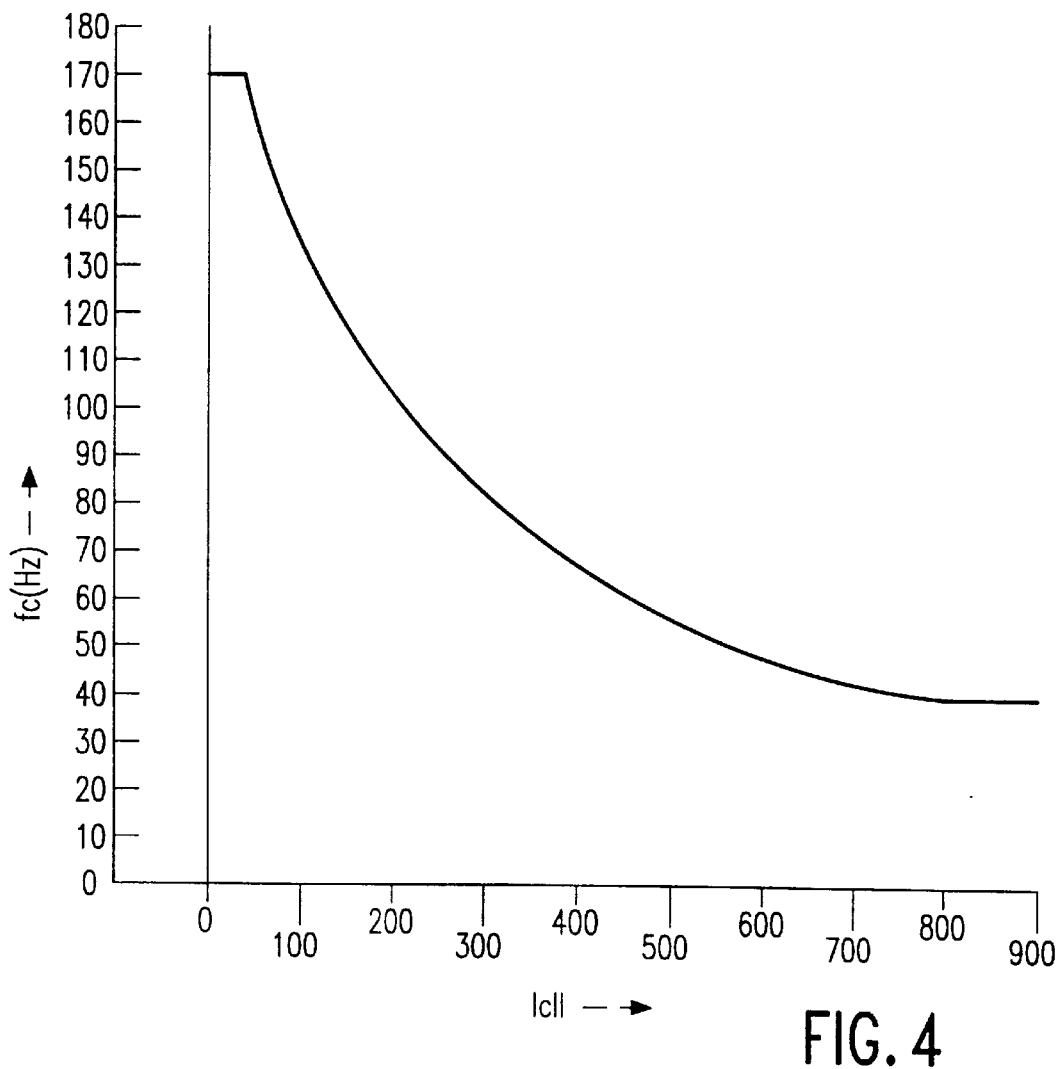
FIG. 4 shows a graph showing the dependency of the loop filter bandwidth from the lcll-counter.

FIG. 4 shows the ll_filter bandwidth $f_c$ as a function of the convergence counter "lcll" for $f_H$=15,625, $\alpha_0$=0.90, CONV=0.04 and TR0=25. In FIG. 4, TR1 is chosen at 800 lines in order to more clearly show the horizontal parts for lcll<25 and lcll>800. At lcll>800, the bandwidth $f_c$, is then 39.52 Hz. In a practical embodiment, the upper threshold "TR1" may be as large as 10,000 giving a final bandwidth of 3.92 Hz. With this low bandwidth, the synchronization is very robust.

Table 1 shows the program-function "ll_filter" in C-code. Those who are acquainted with C-code will easily understand the operation of this function. The Table 1 shows line numbers which are not part of the C-code, but which are inserted for easy reference.

Lines 1–6 of Table 1 contain the definition of the constants, and lines 8–9 contain the declaration of the global variables so far as used in the function "ll_filter". Lines 11–38 contain the proper function "ll_filter". Line 40 shows the statement which is part of the main program and by which the function "ll_filter" is called. In lines 16–27 the counter "lcll" is increased by 1 each time the function is called until the value of TR1 is reached. Further, in these lines, the value of the variable "alpha" is calculated in dependence on the value of counter "lcll" and in accordance with formulae IV–VI. The statement in lines 29–30 contains the filter-function which has the z-transform given in formula I and which uses the filtered line length "ll_1" of the previous line and the filtered line length "ll_2" of the second previous line. These values are updated in lines 34–35 of the Table for use during the next execution of the function "ll_filter".

In the present program (lines 31–32 of Table 1), the counter "lcll" is reduced to zero when the difference between the presently found filtered line length "rval" and the previously found filtered line length "ll_1" is larger than the constant "LL_THRESHOLD". This constant is, e.g., 0.05, i.e., 1/20 of a CVBS-sample period which corresponds to 3,7 ns. It is also possible not to fully reset the counter but, instead, to reduce the counter, e.g., by a factor 10, each time the condition of line 31 of the table is fulfilled. From the above, it may be clear that, between TR0 and TR1, the counter "lcll" is increased (by 1), and consequently, the bandwidth of the line length filter is reduced during each execution of "ll_filter" in which the condition of line 31 is not fulfilled, i.e., when the predetermined degree of synchronization persists that the difference between the presently found filtered line length and the previously found filtered line length is smaller than (or equal to) LL_THRESHOLD .

The filtered line length value is stored in the local variable "rval", returned by the function "ll_filter" in line 37 of the Table and transferred to the global variable "ll_est" in line 40 of the Table.

As earlier explained, the calculated slice level "slice_calc" and the calculated black level "black calc" are both filtered in program module M5. The black level filter and the slice level filter have the same z-transform as the line length filter (formula II). The counter "lcll", calculated in the function "ll_filter", is also used to reduce the bandwidth of these two filters. The only difference between the line length filter and the black-level and slice level filters is that the constant "CONV" in the last two filters is greater (0.25) than in the first filter (0.04). The greater this constant is, the greater is the bandwidth-reduction which is obtained with the control by the counter "lcll".

Returning now to FIG. 2, it has already been observed that the loop filter module M9 also contains a filter for the calculated phase difference "dphi_calc". This filter may also be a recursive second order digital filter with a z-transform as given in Formula II and which is similarly controlled by the counter "lcll", so that the phase-locked loop may become still more stable and less affected by input distortions the longer a proper synchronization exists, i.e., the more the synchronization is reliable. However, for this "dphi_filter", a more simple solution is available. To explain this, it may be observed that the bandwidth of a phase-locked loop depends on the bandwidth of the loop filter, but also on its loop gain, in other words, the bandwidth of a phase-locked loop may be reduced by reducing the bandwidth of the loop filter, but may also be reduced by reducing the loop gain. When the loop gain is reduced, the coupling between received input signal and oscillator becomes looser so that noise and other disturbances present in the input signal have lesser effect on the operation of the oscillator; on the other hand, more time is needed for the oscillator to become synchronized. Apparently, substantially the same effects occur when the loop filter bandwidth is reduced as when the loop gain is reduced.

Therefore, the function "dphi_filter" may be a filter similar to the "ll_filter", however, it is more convenient to use for the "dphi_filter" an "lcll"-controlled attenuator. Table 2 gives an example of a C-code for this function. In this Table 2, lines 1 to 6 contain the global constants and variables used in the function, lines 8 to 23 contain the proper "dphi_filter"-function, and line 25 contains the function call. Within the interval TR0≦lcll≦TR1, the variable "alpha" is increased linearly with the counter "cll". In line 20, the phase difference "dphi_calc" is attenuated by 1/(alpha+1). This implies that, when the counter "lcll" has reached its maximum value TR1, only 1/8979 part of the calculated phase difference "dphi_calc" is transferred as "dphi_est" to the oscillator module M10.

It may be noted that it is not possible to use an "lcll"-controlled attenuator for the line length filter. The reason is that in the steady state, i.e., when the system is properly synchronized and stable, the correct line length value has to be transferred through the filter and this value should not be influenced by the counter "lcll". The same applies to the slice level- and the black level filters. Note that the z-transform H(z) of these filters at zero frequency (z=1) is independent of α. (H(1)=C in formula I, H(1)=1 in formula II). On the other hand, the steady state condition of the phase difference "dphi_calc" is zero, so that there is no objection to use an "lcll"-controlled attenuator for this signal.

FIG. 2 further shows, in program module M9, although strictly speaking not part of the phase-locked loop, a function "phi_filter" for filtering a variable "phi_calc" which is the calculated average of phi_0 and phi_1. Because phi_0+phi_1 is the calculated width of the current synchronization pulse in the y[ ]-array, the variable "phi_calc" represents the calculated half-width of this pulse. This variable is filtered in the function "phi_filter" to reduce noise and other disturbances. In practice, the function "phi_filter" was identical to and was identically controlled by counter "lcll" as the above described slice level and black level filters.

The oscillator module M10 shows the two following statements:

1. "hs_est=hs_exp−dphi_est". The variable "hs_exp" was found during the previous execution of the program and contains the (at that time expected) center-position of the currently measured horizontal synchronization pulse. "dphi_est" is the filtered phase error between "hs_exp" and the center of the current synchronization pulse and, therefore, the variable "hs_est" contains the corrected position of the center of the current synchronization pulse. It has already been described that "dphi_est" is only a small fraction of the measured phase-difference "dphi_calc". Therefore, the correction is only partial so that the synchronization gradually converges to the correct position during a large number of program-executions (=TV-lines).

2. "hs_exp=hs_est+ll_est−Nsync". In this statement the new value of "hs_exp" is calculated, pointing to the expected position of the center of the next synchronization pulse. This is done by adding to the position of the center of the current synchronization pulse, the estimated line length "ll_est". Nsync is an integer comprising the number of signal-samples which are shifted in the CVBS[ ]-array at the beginning of the present execution-cycle, and it is obvious that the variable "hs_exp" should be corrected for this shift.

Finally the program enters into a module M11 comprising the statements:

1. "dphi_calc1=dphi_calc", which updates the variable "dphi_calc1" for use in loop filter module M9 of the next execution cycle.

2. "Hsync=hs_est−2
phi_est". The variable "hs_est" points to the center position of the current horizontal synchronization pulse. It is desirable to output a variable "Hsync" pointing to the leading edge of the current horizontal synchronization pulse. Therefore, "hs_est" is corrected by "phi_est" which represents the half-width of the current synchronization pulse. Because "phi_est" is expressed in y[ ]-sampling periods, a multiplication by factor 2 is needed to make the correction in CVBS[ ]-sampling periods. The variable "Hsync" can be used to locate horizontal synchronization sample(s) at the proper position in the output buffer of RAM 10 in FIG. 1. Then, reading the output buffer by DMA 12 results in horizontal synchronization pulses at the proper instant at the output of DAC 7. A drawback of this method is that the synchronization pulses can not be generated with floating point accuracy although the variable "Hsync" has floating point accuracy. A preferred method is to use the variable "Hsync" to interpolate the video samples by the DSP before or after the color decoding), so that each TV line contains a constant number of video samples, e.g., 720 Y-samples, 360 U-samples and 360 V-samples per active video line. Then, instead of controlling the position of the synchronization pulses, "Hsync" is used to control the time-base of the video while the sync pulse position is fixed.

3. "Nsync=2
ll_est−Nsync+hs_est−48". This statement calculates the new value of Nsync, i.e., the number of input samples which have to be copied into the CVBS[ ]-array at the beginning of the next execution cycle. It can be shown that in the stable locked synchronization state, hs_est converges to 48 and Nsync to ll_est. difference "dphi_calc" is larger than, e.g., 5, the program does not execute the described loop filter module M9 but passes through modules M9a, M10a and M11a, so that the apparently erroneous values of phi_0, phi_1 and dphi_calc are not further used. Instead, the original values of ll_est, dpi_est and phi_est, found during the preceding execution cycle, are again used to create new values of hs_estand hs_exp in module M10a which comprise the same statements as module M10. In module M9a, the convergence counter lcll is reduced by 1. After the execution of module M10a, the program executes module M11a which is identical with module M11 except in that the variable "dpi_calc1" is not made equal to the (erroneous) value of "dphi_calc" but is set to zero instead.

It may be observed that many modifications can be made on the above given implementation without departing from the scope of the invention. For instance, instead of both the "l_filter" and the "dphi_filter" being controlled by the "lcll" counting, only one of these filters may be controlled. Also, instead of the above described preferred use of a dual loop (phase and line length) PLL, a single loop PLL may be used wherein the single loop filter is bandwidth controlled in response to the result of the "lcll"-counting. In this case, it is not possible to control the loop gain because, in the steady locked state, the phase difference between oscillatory signal and received signal is usually not zero. A phase difference is required to pull the oscillator from its natural frequency to the frequency of the received signal.

The description including tables 1 and 2 and the accompanying figures present a software implementation of the invention. It may be noted that such a software implementation is far more economical and flexible than a corresponding hardware implementation.

TABLE 1

C-code of program function "ll_filter"

```
1   #define     TR0             25
2   #define     TR1             10000
3   #define     LL_THRESHOLD    0.05
4   #define     CONV                    0.04
5   #define     ALPHA0          0.9
6   #define     RALPHA0         (1 / (1 - ALPHA0))
7
8   double      ll_calc, ll_est, ll_1, ll_2;
9   int         lcll;
10
11  double
12  ll_filter(double ll_calc)
13  {
14      double alpha, rval;
15
16      if (lcll < TR0)
17      {
18          alpha = ALPHA0;
19          lcll = lcll + 1;
20      }
21      else if (lcll < TR1)
22      {
23          alpha = 1 - 1 / (CONV * (lcll - TR0) + RALPHA0);
24          lcll = lcll + 1;
25      }
26      else
27          alpha = 1 - 1 / (CONV * (TR1 - TR0) + RALPHA0));
28
29      rval = ll_calc + 2 * alpha * (ll_1 - ll_calc)
30          -alpha * alpha * (ll_2 - ll_calc);
31      if (fabs(ll_1 - rval) > LL_THRESHOLD)
32          lcll = 0;
33
34      ll_2 = ll_1;
35      ll_1 = rval;
36
37      return (rval);
38  }
39
40  ll_est = ll_filter(ll_calc);
```

TABLE 2

C-code of program function "dphi_filter"

```
1   #define     TR0             25
2   #define     TR1             10000
3   #define     DPHI_CONV                   0.9
4
5   double      dphi_calc, dphi_est;
6   int         lcll;
7
8   double
9   dphi_filter(double dphi_calc)
10  {
11      double alpha, rval;
12
13      if (lcll < TR0)
14          alpha = DPHI_CONV;
15      else
16      if (lcll < TR1)
17          alpha = DPHI_CONV * (lcll - TR0 + 1);
18      else
19          alpha = DPHI_CONV * (TR1 - TR0 + 1);
20      rval = dphi_calc / (alpha + 1);
21
22      return (rval);
23  }
24
25  dphi_est = dphi_filter(dphi_calc);
```

I claim:

1. A method for recovering horizontal synchronization from a received TV signal by means of a phase-locked loop, said method comprising the steps:

generating a recurring oscillatory signal;

phase comparing phase-comparing said oscillatory signal with horizontal synchronization pulses of said received TV signal;

low-pass filtering the result of the phase comparisons; and controlling the generation of the oscillatory signal using the filtered result of the phase comparison so as to reduce the phase error between the oscillatory signal and the horizontal synchronization pulses of the received TV signal, characterized in that said method further comprises the steps:

counting the number of periods during which a predetermined degree of synchronization between said oscillatory signal and the horizontal synchronization pulses of the received TV signal persists; and controlling a bandwidth of said phase-locked loop in response to the result of said counting step so as to progressively reduce said bandwidth when said number of periods increases.

2. A method as claimed in claim 1, characterized in that said method further comprises the step:

generating a signal indicative of the length of the period of said oscillatory signal using the result of the phase comparison step;

low-pass filtering the length indicative signal; and controlling the generation of said oscillatory signal using the filtered length indicative signal, whereby the bandwidth of the low-pass filtering is controlled by the result of said counting.

3. A method as claimed in claim 2, characterized in that the zero frequency transfer of the low-pass filtering of the length indicative signal remains unaffected from the control of the bandwidth.

4. A method as claimed in claim 3, characterized in that the low-pass filtering of the length indicative signal is a digital filtering having a z-transform function $$C^*(1-\alpha)^n/(1-\alpha/z)^n$$

wherein C is a constant, n is a positive integer and α is controlled by the result of the counting.

5. A method as claimed in claim 2, wherein the result of the phase comparison is used to additionally control the phase of said oscillatory signal, characterized in that the result of the counting controls the said phase control.

6. A method as claimed in claim 5, characterized in that the result of the counting progressively attenuates the phase control of the oscillatory signal when said number of periods increases.

7. A method as claimed in claim 1, characterized in that the bandwidth of said phase-locked loop is kept constant at a certain level during a first number of said periods, is progressively reduced towards a lower level during a second number of periods, and is again kept constant at the lower level when the number of periods exceeds said second number.

8. A method as claimed in claim 1, characterized in that the bandwidth of the phase-locked loop is increased when the predetermined degree of synchronization no longer exists.

9. A method as claimed in claim 1, characterized in that said method further comprises the steps:
   detecting, from the received TV signal, a slice level;
   low-pass filtering the slice level;
   using the filtered slice level in the phase comparison between said oscillatory signal and the horizontal synchronization pulses of the received TV signal; and
   additionally controlling the bandwidth of the slice level filtering using the result of the counting, so as to progressively reduce this bandwidth when said number of periods increases.

10. A device for recovering horizontal synchronization from a received TV signal by means of a phase-locked loop, said device comprising:
   means for generating a recurring oscillatory signal;
   means for phase comparing said oscillatory signal with horizontal synchronization pulses of said received TV signal;
   means for low-pass filtering the result of the phase comparisons; and
   means for controlling the generation of the oscillatory signal using the filtered result of the phase comparison, so as to reduce the phase error between the oscillatory signal and the horizontal synchronization pulses of the received TV signal,
   characterized in that the device further comprises:
      means for counting the number of periods during which a predetermined degree of synchronization between said oscillatory signal and the horizontal synchronization pulses of the received TV signal persists; and
      means for controlling a bandwidth of said phase-locked loop in response to the result of said counting so as to progressively reduce said bandwidth when said number of periods increases.

11. A device as claimed in claim 10, characterized in that said device comprises a digital signal processor; and a memory containing a stored program to control the operation of the device.

12. A storage medium comprising a stored program to control the operation of a signal processor for recovering horizontal synchronization from a received TV signal by means of a phase-locked loop, said recovering comprising the steps:
   generating a recurring oscillatory signal;
   phase comparing said oscillatory signal with horizontal synchronization pulses of said received TV signal;
   low-pass filtering the result of the phase comparison; and
   controlling the generation of the oscillatory signal using the filtered result of the phase comparison, so as to reduce the phase error between the oscillatory signal and the horizontal synchronization pulses of the received TV signal, characterized in that said recovering includes the steps:
      counting the number of periods during which a predetermined degree of synchronization between said oscillatory signal and the horizontal synchronization pulses of the received TV signal persists; and
      controlling a bandwidth of said phase-locked loop in response to the result of said counting so as to progressively reduce said bandwidth when said number of periods increases.

13. A signal comprising a program to control the operation of a signal processor for recovering horizontal synchronization from a received TV signal by means of a phase-locked loop, said program comprising the steps:
   generating a recurring oscillatory signal;
   phase comparing said oscillatory signal with horizontal synchronization pulses of said received TV signal;
   low-pass filtering the result of the phase comparison; and
   controlling the generation of the oscillatory signal using the filtered result of the phase comparison, so as to reduce the phase error between the oscillatory signal and the horizontal synchronization pulses of the received TV signal, characterized in that said program being characterized by the step of includes the steps:
      counting the number of periods during which a predetermined degree of synchronization between said oscillatory signal and the horizontal synchronization pulses of the received TV signal persists; and
      controlling a bandwidth of said phase-locked loop in response to the result of said counting so as to progressively reduce said bandwidth when said number of periods increases.

14. A display apparatus comprising:
   a display device with a display screen;
   a device for recovering horizontal synchronization from a received TV signal by means of a phase-locked loop, said recovering device comprising:
      means for generating a recurring oscillatory signal;
      means for phase comparing said oscillatory signal with horizontal synchronization pulses of said received TV signal;
      means for low-pass filtering the result of the phase comparison;
      means for controlling the generation of the oscillatory signal using the filtered result of the phase comparison, so as to reduce the phase error between the oscillatory signal and the horizontal synchronization pulses of the received TV signal; and means for supplying horizontal scanning information being related to the oscillatory signal, said display device further comprising an addressing unit receiving the horizontal scanning information for determining a horizontal position of the TV signal on the display screen, characterized in that the display apparatus further comprises:

means for counting the number of periods during which a predetermined degree of synchronization between said oscillatory signal and the horizontal synchronization pulses of the received TV signal persists; and means for controlling a bandwidth of said phase-locked loop in response to the result of said counting, so as to progressively reduce said bandwidth when said number of periods increases.

* * * * *